Dec. 5, 1933.   C. G. OLSON   1,938,399
LOCK WASHER
Filed Dec. 13, 1930
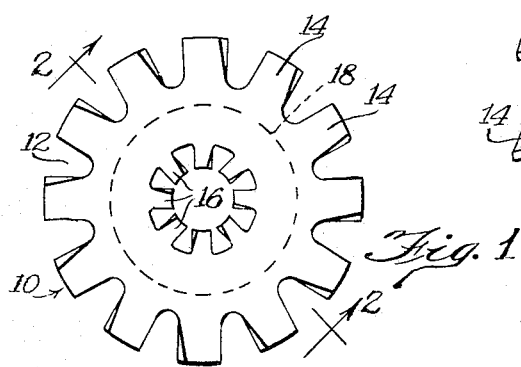
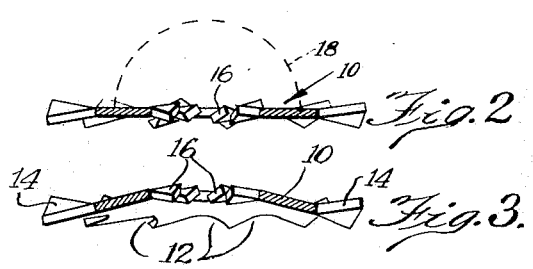
Inventor:
Carl G. Olson
By Cheever Cox & Moore
Attys Patented Dec. 5, 1933

1,938,399

UNITED STATES PATENT OFFICE 1,938,399

LOCK WASHER

Carl G. Olson, Chicago, Ill., assignor to Shakeproof Lock Washer Company, Chicago, Ill., a corporation of Delaware Application December 13, 1930
Serial No. 502,017

2 Claims. (Cl. 151—35)

My invention relates in general to lock washers and has more particular reference to a lock washer suitable for use on soft material such as wood, leather, fiber, tin, aluminum, and similar materials, the same being an improvement and enlargement of the invention set forth in my copending application Serial No. 479,173, filed September 2, 1930.

One of the important objects of my present invention is to provide a lock washer particularly adapted for use with wood screws and similar fastening members employed in connection with soft materials of the class indicated and to this end I propose to employ a washer having teeth adapted to engage the head of the fastening member and additional teeth situated at a substantial distance from the fastening member and adapted to imbed themselves into the soft material in which the fastening member is or may be mounted.

Another object of my invention is to provide a lock washer of the class described having an internal set of teeth for engaging a fastening member such as the head of a screw and external or peripheral teeth situated at a substantial distance from the fastening member whereby the washer has a larger gripping area on the soft material with which it is used and also permits the locking means to be located further away from the center or axis of rotation of the fastening means.

Still another object of my invention is to provide a lock washer of the class described having inner locking means for engaging the fastening member and remotely situated external locking means for engaging the work piece to which the fastening member and lock washer are mounted, the lock washer having a substantial resilient portion intermediate the locking teeth whereby when the fastening member is drawn up tight with respect to the work piece, the lock washer is distorted and deflected from its normal configuration whereby the resilience of the lock washer may be employed to more firmly lock the parts in the desired position.

The above and numerous other objects and advantages of the invention will be apparent as the invention is more fully understood from the following detailed description, which taken in connection with the accompanying drawing, discloses lock washers embodying my invention.

Referring to the drawing:

Figure 1 is a plan view of a lock washer embodying my invention;

Figure 2 is a sectional view of the washer illustrated in Figure 1, the section being taken substantially along the line 2—2; and Figure 3 is a transverse sectional view similar to Figure 2 disclosing a washer in which the body portion is normally flexed in an axial direction.

In Figures 1 and 2 I have shown a washer 10 embodying my present invention. The washer 10 is formed from a substantially flat disc. The washer 10 is provided with a spaced series of notches 12 in its outer edge defining spaced projections or teeth 14, which teeth are warped or twisted as illustrated out of the plane of the material from which the washer is formed. It will be apparent that the lower edges of these teeth or prongs, when the washer is pressed against the surface of the work piece, will bite into the work material and these teeth being spaced at a substantial distance from the center of the washer, will serve to securely prevent rotation of the washer. The intermediate portions of the washer may, of course, be perfectly flat since this will not change the effect which I produce by forming the twisted teeth 14 at a substantial distance from the center of the washer, but in some instances I prefer to dish the washer upwardly as shown in Figure 3. The central portions of the washer also are notched to provide a spaced series of teeth 16 which teeth also are twisted or warped out of the plane of the material forming the washer in order to provide locking means for engaging the fastening member.

In Figure 2 the body of the washer is flat but the inner teeth 16 do not extend outwardly of the washer stock quite so far as do the outer peripheral teeth 14 and so, when the washer is clamped to a flat work surface, the outer teeth will first engage the surface and the inner teeth only after the fastening member has been drawn up tight. The flat body portion of the washer will thus be tensioned as in the other forms illustrated.

By forming the outer locking teeth in the washers of my present invention at a substantial distance from the fastening member, I have provided a washer of maximum efficiency which will resist to the utmost relative movement between the washer and the work piece in which the fastening member is arranged. The resilience effect which I have obtained by dishing the washers upwardly also strengthens the locking connection with the fastening member and also permits the locking effect to be continued through a relatively greater range, the fastening member being subjected to a locking urge even though it is quite loose.

My improved washers have a very practical application in connection with securing parts in position upon a wooden structure. For example, when it is desirable to secure a nut or screw head 18, as indicated by the dotted lines in Figures 1 and 2, against loosening when said screw is used to secure a part to a wooden frame, such as the frame of a radio cabinet, the teeth or prongs 14 are positioned at a point sufficiently spaced from the axis of the washer to effectively dig into the surface of the wood and thereby secure the washer against relative movement with respect thereto. Under such circumstances the hole within the wooden frame may be relatively large as compared with the size of the screw shank, the washer in that instance extending outwardly a sufficient radial distance to completely span the hole and present the locking teeth to the surface of the wood. Thus, the washer not only serves to cover the hole, but also produces an effective means for securing the nut or screw head against loosening.

It should be noted that lock washers of the type described above are adapted to be effectively employed in connection with work pieces which are subject to expansion or contraction. Thus, for example, in referring to Figure 3, it will be seen that, if the work pieces between which the washer is clamped are comprised of material which is subject to expansion or contraction, the resiliency of the washer serves to accommodate the teeth of the washer to the contraction or the expansion of the work piece, and in this manner the locking effectiveness of the washer upon the screw head is unimpaired. Another fact which should be noted is that washers of the dished type shown in Figure 3 exert a pressure along their outer margin when a screw is tightened against the inner marginal teeth 16. This pressure is distributed toward the center, and when the washer has been completely tightened against the work piece, the entire surface thereof is tensioned against the work. This is to be clearly distinguished from a straight washer which, when tensioned against the work, will exert the greatest pressure under the head of the screw or near the body of the screw and not at the outer rim. This is due to the fact that the outer portion of such a washer is free to spring away from the work as distinguished from the dished washer shown in Figure 3, wherein the entire washer body is so tensioned as to cause the load to be uniformly distributed over the entire washer.

It is thought that the invention and numerous of its attendant advantages will be understood from the foregoing description, and it is obvious that numerous changes may be made in the form, construction, and arrangement of the several parts without departing from the spirit or scope of my invention or sacrificing any of its attendant advantages.

Having thus described my invention, what I claim as new and desire to secure by Letters Patent is:

1. A lock washer including an intermediate annular body portion of unbroken continuity, a plurality of prongs provided along the inner margin of said body portion, each of said prongs being warped so as to present work engaging teeth on opposite sides of the body portion for lockingly engaging the clamping surface of a member such as a screw head, and a plurality of prongs along the outer margin of said body portion, each prong being warped so as to present work engaging teeth projecting in opposite directions out of the plane of the body portion, said outer teeth being spaced a sufficient distance from the washer axis to prevent interference of said teeth with the clamping surface tightened against the inner teeth, the inner teeth projecting a distance out of the plane of the washer body which is less than the distance which the outer teeth project out of said plane, whereby to cause the washer body to flex axially when it is initially tightened in position.

2. A lock washer including an intermediate annular body portion of unbroken continuity, a plurality of prongs provided along the inner margin of said body portion, each of said prongs being warped so as to present work engaging teeth on opposite sides of the body portion for lockingly engaging the clamping surface of a member such as a screw head, and a plurality of prongs along the outer margin of said body portion, each prong being warped so as to present work engaging teeth projecting in opposite directions out of the plane of the body portion, said outer teeth being spaced a sufficient distance from the washer axis to prevent interference of said teeth with the clamping surface tightened against the inner teeth, the disposition of the inner and outer teeth being such as to effect axial flexing of the body when the washer is initially clamped in position upon a work piece.

CARL G. OLSON.